United States Patent [19]

Mattson et al.

[11] Patent Number: 4,463,424
[45] Date of Patent: Jul. 31, 1984

[54] METHOD FOR DYNAMICALLY ALLOCATING LRU/MRU MANAGED MEMORY AMONG CONCURRENT SEQUENTIAL PROCESSES

[75] Inventors: Richard L. Mattson, San Jose, Calif.; Juan A. Rodriguez-Rosell, Gaithersburg, Md.

[73] Assignee: International Business Machines Corporation, Armonk, N.Y.

[21] Appl. No.: 544,331

[22] Filed: Oct. 21, 1983

Related U.S. Application Data

[63] Continuation of Ser. No. 235,806, Feb. 19, 1981, abandoned.

[51] Int. Cl.$^3$ .............................................. G06F 13/00
[52] U.S. Cl. .................................... 364/300; 364/200
[58] Field of Search ................ 364/200 MS File, 300

[56] References Cited

U.S. PATENT DOCUMENTS 4,310,883  1/1982  Clifton et al. .................... 364/200

Primary Examiner—Raulfe B. Zache
Attorney, Agent, or Firm—R. Bruce Brodie

[57] ABSTRACT

Short traces of consecutive CPU references to storage are accumulated and processed to ascertain hit ratio as a function of cache size. From this determination, an allocation of cache can be made. Because this determination requires minimal processing time, LRU-referenceable memory space among concurrently executing sequential processes is used dynamically by a CPU cache manager.

4 Claims, 5 Drawing Figures

| ORDERED LIST L1 ITEM | n-TUPLE f, b, g | |
|---|---|---|
| K=9  9 | 2, 9, 1 | |
| 2 | 10, 9, 1 | GROUP 1 |
| 10 | 6, 2, 1 | |
| 6 | 5, 10, 2 | GROUP 2 |
| 5 | 1, 6, 2 | |
| 1 | 7, 5, 3 | GROUP 3 |
| 7 | 8, 1, 9 | |
| 8 | 4, 7, 4 | GROUP 4 |
| 4 | 3, 8, 4 | |
| 3 | 11, 4, 5 | GROUP 5 |
| Lo=11  11 | 11, 3, 6 | GROUP 6 |

TABLE T1

| GROUP | M, A, H, L |
|---|---|
| 1 | 3, 3, 0, 10 |
| 2 | 4, 2, 1, 5 |
| 3 | 3, 2, 3, 7 |
| 4 | 10, 2, 1, 4 |
| 5 | 10, 1, 2, 3 |
| 6 | 1, 1, 0, 11 |

ORDERED LIST L1 AND TABLE T1 FOR k=3

|  | ORDERED<br>LIST L1<br>ITEM | n-TUPLE<br>f, b, g |  |
|---|---|---|---|
| K=9 | 9 | 2, 9, 1 | |
|  | 2 | 10, 9, 1 | GROUP 1 |
|  | 10 | 6, 2, 1 | |
|  | 6 | 5,10, 2 | GROUP 2 |
|  | 5 | 1, 6, 2 | |
|  | 1 | 7, 5, 3 | GROUP 3 |
|  | 7 | 8, 1, 9 | |
|  | 8 | 4, 7, 4 | GROUP 4 |
|  | 4 | 3, 8, 4 | |
|  | 3 | 11, 4, 5 | GROUP 5 |
| La=11 | 11 | 11, 3, 6 | GROUP 6 |

TABLE T1

| GROUP | M, A, H, L |
|---|---|
| 1 | 3, 3, 0,10 |
| 2 | 4, 2, 1, 5 |
| 3 | 3, 2, 3, 7 |
| 4 | 10, 2, 1, 4 |
| 5 | 10, 1, 2, 3 |
| 6 | 1, 1, 0,11 |

ORDERED LIST L1 AND TABLE T1 FOR k=3

FIG. 1

| ITEM<br>NUMBER | TABLE L1<br>f, b, g |
|---|---|
| 1 | 7, 5, 3 |
| 2 | 10, 9, 1 |
| 3 | 11, 4, 5 |
| 4 | 3, 8, 4 |
| 5 | 1, 6, 2 |
| 6 | 5,10, 2 |
| 7 | 8, 1, 3 |
| 8 | 4, 7, 4 |
| 9 | 2, 9, 1 |
| 10 | 6, 2, 1 |
| 11 | 11, 3, 6 |

| F | La |
|---|---|
| 9 | 11 |

TABLE T1

|  | M, A, H, L |
|---|---|
| 1 | 3, 3, 0,10 |
| 2 | 4, 2, 1, 5 |
| 3 | 3, 2, 3, 7 |
| 4 | 10, 2, 1, 4 |
| 5 | 10, 1, 2, 3 |
| 6 | 1, 1, 0,11 |

TABLE L1 AND TABLE T1 FOR k=3

FIG. 2

FIG.3 GPPF STACK PROCESSING ALGORITHM WHEN CODE = R OR W

FIG. 4 GPPF STACK PROCESSING ALGORITHM WHEN CODE = E

FIG. 5 (PRIOR ART) CACHE MANAGER OPERATIONS

METHOD FOR DYNAMICALLY ALLOCATING LRU/MRU MANAGED MEMORY AMONG CONCURRENT SEQUENTIAL PROCESSES

This is a continuation of application Ser. No. 235,806 filed Feb. 19, 1981.

TECHNICAL FIELD

This invention relates to cache management and, more particularly, to a machine-implementable method for dynamically selecting pageable groups of data from a data base for temporary storage in one or more buffered cache stages of a hierarchical storage system.

BACKGROUND

Machine-implementable page replacement methods have been used to control the movement of pages and to effect the dynamic association between the logical address space and the physical address space of a storage hierarchy. However, performance measures, such as hit/miss ratios, could not be used dynamically in order to "tune" cache performance with respect to cache size and the selection of pageable groups of data from a data base. This inability to dynamically tune performance resulted from the fact that for a given group of pageable data in a data base, the determination of hit/miss ratios as a function of cache size involved a computational complexity proportional to the size of the pageable group of data. Since these pageable groups were typically very large, then the hit/miss ratios could be ascertained only offline at considerable computational expense.

The prior art teaches that a hierarchical storage system having an LRU/MRU page replacement policy requires a substantially smaller number of pages subject to an accessible demand paging regimen than a single level store. The performance of the caches (buffered stages), as has been previously been mentioned, has been characterized by hit/miss ratios. A "hit" means that a READ reference to the cache generated by a requesting CPU executable process locates the data item it desires in the high-speed cache, rather than in a lower speed backing store. A "hit" with respect to a WRITE reference is made when the CPU-executable process through the cache manager finds a counterpart location in a partially full buffer to overwrite. In this regard, a "miss" is registered if the data is unavailable in cache with respect to a READ reference or if an item must be destaged to make room for a WRITE reference.

If data must be destaged or staged up between the small high-speed cache and the larger, but slower, backing store, staging algorithms are required. Popular algorithms, such as least recently used (LRU) or most recently used (MRU), maintain in the cache inventory those items which, more likely than not, will be referenced by a CPU-executable process in the future. A cache not containing a referenced item and otherwise full must remove one of its data elements so that it can be replaced by the requested item. Thus, the system tries to replace the least recently referenced item under the assumption that items which have not been referenced for a long time will not likely be referenced in the future.

The sharing of a high-speed cache among sequential tasks concurrently executing either on a single CPU or among several CPU's is known. In such an environment, a CPU and counterpart hierarchical storage system invoke a global cache management policy permitting equal access to all requesting processes to a scarce resource. This scarce resource is, namely, insufficient cache space. Further, the prior art teaches the use of fixed constraints to regulate or assign cache space. For example, if drums and discs are used to hold pages for all of the system's users, with the system maintaining the most frequently used pages on a drum, some users who rapidly access every page in their page space exactly once and then repeat could take over all the drum space at the expense of other users. For reasons of this type, a cache manager puts a fixed maximum limit on a number of pages any user can occupy. Other systems might assign a different fixed limit for each user. However, once a limit has been assigned, it is the typical experience that after a user fills his cache space he may have a low hit ratio. Also, if during a time interval an executing process references a cache too rapidly with respect to a fixed space allocation, the space limit may be progressively reduced for the next time interval, and vice versa. In this scheme, two or more contending processes, one moving relatively fast and the other relatively slow, might result in the slower user dominating the cache space.

The following references are illustrative of the state of the art. Mattson, et al, "Evaluation Techniques for Storage Hierarchies," IBM Systems Journal No. 2, 1970, pages 78-117, teaches that hit/miss ratios for a given LRU page replacement method in a storage hierarchy can be measured as a function of data set groups and cache size in a single pass. Advantageously, the time required is proportional to the data base size.

Mattson, "Storage Management of Linear Lists by Ordinal Numbers", IBM Technical Disclosure Bulletin, Vol. 19, December 1976, pages 2709-2714, describes a method and means for determining the stack distance of the currently referenced item and then updating of the entire stack in a single memory READ/WRITE cycle for cache-stored LRU lists. Advantageously, the lists could be maintained in real time without slowing the CPU. In this regard, both storage management and system measurement using LRU page replacements could be accomplished at considerable hardware expense, the amount of hardware again being proportional to the data base size. Additionally, this reference merely sets forth the determination of cache size. It does not teach the selection of what prospective data set group is to be placed in the cache. Lawler, in "Fast Approximation Algorithms for Knapsacks Problems," Mathematics of Operations Research, Vol. 4, November 1979, pp. 339-356, describes a method for selecting one cache size (from $p+1$ cache sizes) from each of q groups of cache sizes, such that the sum of the q cache sizes is less than the system cache size and the sum of the hits obtained from each cache size is maximum. However, Lawler, as does the aforementioned prior art, failed to teach efficient cache allocation in a dynamic paging environment.

THE INVENTION

It is an object of this invention to devise a CPU-implementable method for dynamically selecting pageable groups of data from a data base for temporary storage in one or more buffered stages (caches) of a CPU-accessible hierarchical system; that is, to devise an automatic method for allocating cache space among sequential tasks concurrently executing their workloads and concurrently competing for cache space so that a maximum number of hits is obtained. A maximum is deemed achieved when no other allocation of cache space can increase the number of hits to the cache during a prescribed time interval.

The determination step in the inventive method is premised on the mapping of items in groups of pageable data into an LRU stack partitioned into $p+1$ equivalence classes such that all items in the same class have the same "stack" distance. This permits selecting the cache size from a set of p possible cache sizes. The per reference computation of hit/miss ratios as a function of p possible cache sizes involves a computational complexity proportional to p. Since p is typically very small, then the hit/miss ratios can be acquired online.

Since dynamic tuning of cache performance includes both selecting the cache size from a set of p cache sizes and the pageable group of data from a subset of q data groups, the computational complexity per reference of acquiring the hit/miss ratios to p cache sizes is proportional only to $p \times q$. Relatedly, the per reference processing consumes at most $q \times (p+1)$ information items executable in real time. From the $p \times q$ hit/miss ratios thus obtained both the groups of pageable data and the associated cache sizes can be selected every time interval with a computational complexity of at most $(p+1)q$.

Because the prior art required an unknown amount of per reference processing in which the worst case would require $q \times$ the number of items in the data base, the determination of hit/miss ratios could literally include tens of millions of items to be moved, altered, or scanned. The invention reduces the worst case required per reference processing to an insignificant number.

DESCRIPTION OF THE PREFERRED EMBODIMENT AND INDUSTRIAL APPLICABILITY

This invention is directed to two problems. The first is ascertaining the hit/miss ratio as a function of cache size; and the second, is using such determination to dynamically allocate cache among contending processes. Since the invention is executable by a CPU accessing a demand paging hierarchical storage system, a brief description of a prior art cache manager is introduced. This is followed by a detailed discussion of FIGS. 1 and 2 relating to the organization and modification of the two data constructs critical to the invention. After this, a discussion of the processing of READ/WRITE and ERASE references according to the method of the invention will center on FIGS. 3 and 4. Lastly, an IBM System/370 assembly level execution sequence shall complete the preferred embodiment description. The assembly level sequences illustrate the necessary reference processing and cache management. An association is provided between the principal method steps depicted in the flow diagram of FIGS. 3 and 4 and the assembly level sequences.

The IBM System 370 Environment

The method of this invention is executable upon a computing system of the type including one or more CPU's, each having a main store, input/output channel control unit, direct access storage devices, and other I/O devices coupled thereto. Such a system is described in G. M. Amdahl, et al, U.S. Pat. No. 3,400,371, issued Sept. 3, 1968, and entitled, "Data Processing System." The Amdahl system includes as a resource all of the facilities of either the computing system or of the operating system running thereon which is required for the execution of a process. Typical resources include a main store, I/O devices, the CPU, data sets, and control or processing programs. Furthermore, said systems are capable of "multiprogramming". This pertains to the concurrent execution of two or more processes by a computing system, and can be managed on a computer running under IBM System/360 Operating System, as described in IBM Publication GC28-6646, July 1973, and listed in IBM System/360 Bibliography, GA22-6822.

This invention is intended to be utilized in an operating system environment that contains a conventional data management facility, manages auxiliary storage, and provides traditional program compiler and assembly capabilities. Although assembly level language is described in the aforementioned Amdahl patent and IBM publications, a further introduction may be found in "A Programmer's Introduction to IBM System/360 Assembler Language". This bears an IBM catalogue number of SC201646-6, as reprinted in November 1979. In this regard, the method steps are expressed in source assembly level language statements to be found in Tables 1 and 2.

CPU Accessing of Attached DASD

Data sets are frequently stored on DASD volumes. A CPU's relationship to a DASD begins when the CPU invokes the START I/O instruction. This instruction serves to establish a connection between the CPU and addressed device and the execution of a channel program with the device. The invocation of the START I/O instruction causes control to be relinquished to a series of channel commands. This series or chain of channel commands (CCW's) is, in turn, sent over a channel to a control unit for the purpose of selecting and accessing the device and effectuating the data movement across the interfaces. Each channel program consists of a sequential list of operations resident in the CPU main memory. The transmission to and execution at the control unit of the CCW's takes place only after initial connection between the CPU and the control unit takes place. For each operation (CCW) in the channel program, one or more counterpart operations are required either at the control unit or device level over an active connection. The first active connection is that of an initial selection sequence. This sequence is invoked with a START I/O operation in which an initial path is set up both electrically and logically in terms of device address (virtual/real) and device status (available/busy). The next active connection relates to that of a CCW transfer and execution. A control CCW, such as SEEK, requires physical positioning or activity at the device. A control unit, in response to receipt of the control CCW, can execute the CCW in disconnected mode. In contrast to disconnected modes, CCW's involving the movement or transfer of data between the channel and the device, such as READ or WRITE CCW's, require the control unit to remain connected to the channel in order to effectuate the data transfer. A typical system configuration, including multiple CPU's accessing shared devices over logically independent paths, is described in Luiz, et al, U.S. Pat. No. 4,207,609, entitled "Method and Means for Path Independent Device Reservation and Reconnection in a Multi-CPU and Shared Device Access System," issued June 10, 1980.

Accessing Hierarchical Storage Using Cache Management

A hierarchical storage system differs from that shown in the Amdahl and Luiz references only in the provision of one or more buffered stages interposed between the DASD and the CPU. Where, for example, the cache is within the CPU operating in multiprogramming mode, a cache manager function of the operating system regulates access among requesting processes. As mentioned, a cache is usually a random access highspeed memory in which a selected number of referenceable items are located, rather than in a lower speed backing store (DASD).

Figure 5:
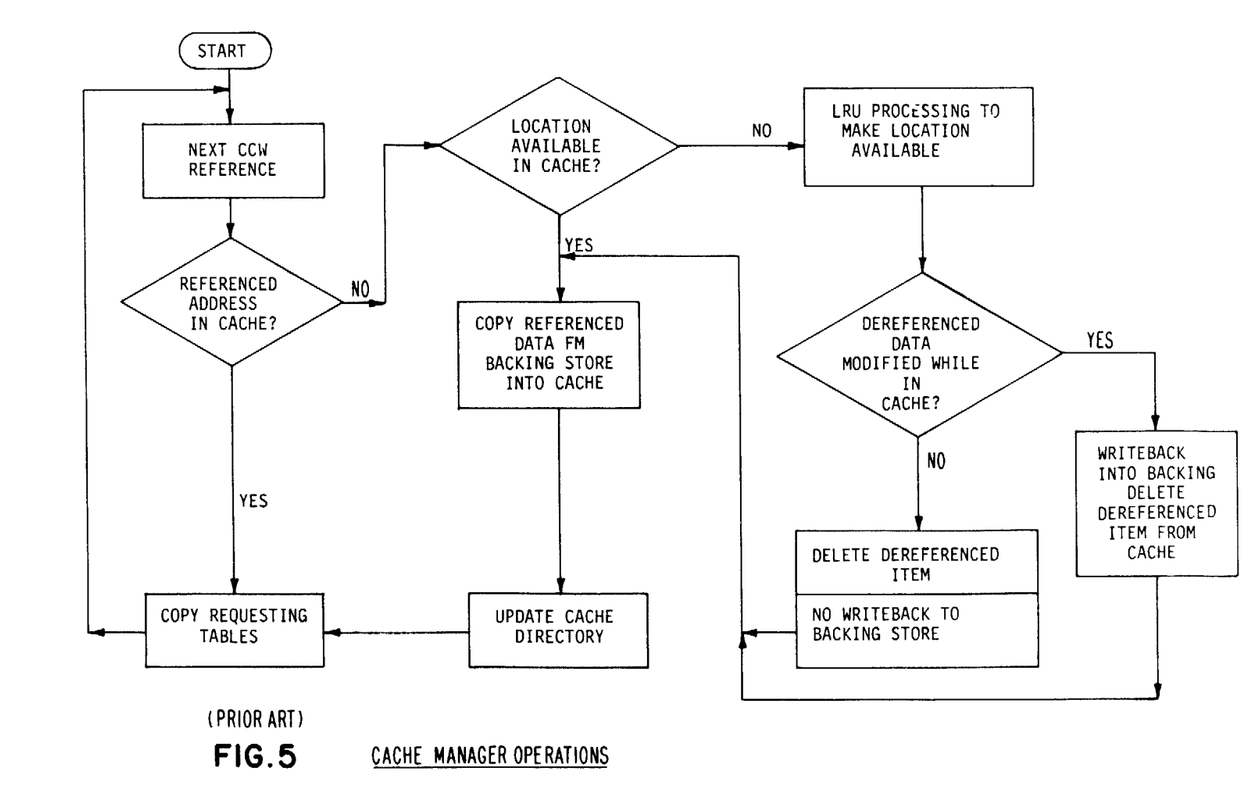
FIG. 5 illustrates cache manager operations according to the prior art.

Referring now to FIG. 5, there is shown a flow diagram of cache function. Thus, a CPU accesses the storage subsystem by way of generating a READ or WRITE CCW. In this regard, the cache manager intercepts each CCW reference to storage and ascertains whether the contents of the reference location were previously copied within the cache. If not, the reference is passed to DASD. The references passed to DASD are staged up to the requesting process. The cache manager also copies the contents of the reference location into cache and updates the cache directory. This involves the determination of whether a cache location is available and, if not, making room therefor according to a destaging algorithm, such as LRU. If the cache is full and it is necessary to dereference the data to make room, a WRITEBACK to the DASD is executed only if the contents of the cache location were modified. Otherwise, only deletion in cache is required. If the contents of the reference location are in cache, then the requesting process is copied. If the reference data is not in cache but a location is available, then the reference data is copied from the backing store into cache, the cache directory is updated, and the requesting process is copied.

The Components of Dynamic Page Group and Cache Size Selection

The invention consists of two communicating components—a data collection component and an analysis component. When the data collection component is invoked, it continually collects the time sequence of requests to items in the various data sets and the data base. After the START I/O instruction has been successfully executed by the CPU, a scan is made of the sequence of CCW's about to be executed by the channel. Typical information recorded about each CCW reference includes (1) a flag indicating the start of a channel program; (2) the type of channel program, such as FETCH, SWAP; (3) the type of operation, such as SEEK, READ/WRITE, ERASE; (4) the physical address of the item being referenced by way of channel, device, cylinder, track, and record; and (5) flags indicative of multitrack searching and data chaining involved in the operation. The determination of this sample size and frequency of collecting reference traces which would constitute an optimally efficient set for analysis, is not believed within the scope of this invention. However, it is believed preferable to periodically process a trace of consecutive references rather than either continuously or aperiodically sampling.

Figure 1:
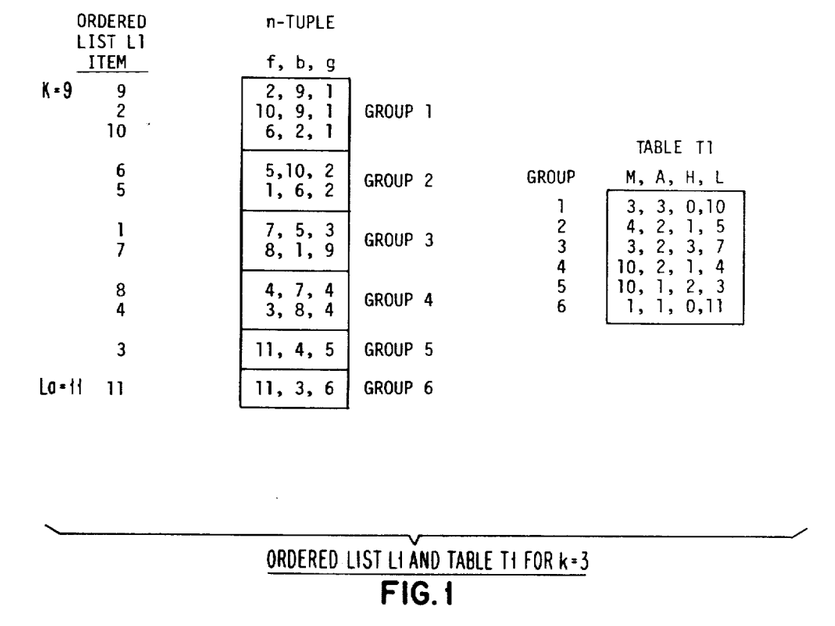
FIG. 1 sets out both an ordered list and table representing a partition of an LRU stack into equivalence classes.

The data analysis component has the objective of determining for each data group the hit ratio for p different values of cache size and at appropriate time intervals to select cache sizes for each data group, such that the number of hits to the system cache from all data groups is maximized. The determination of hit ratio as a function of cache size requires operation upon two data structures. In this regard, reference should be made to FIG. 1. This shows an ordered list (L1) and a table (T1). The ordered list of numbers constitutes a most recently referenced sequence of references to disc tracks. The data structure denoting the ordered list entry includes an n-tuple consisting of a forward pointer f, a backward pointer b, and a group number g. The forward pointer identifies the next item in the list, the backward pointer identifies the previous item in the list and the group number denotes an arbitrary data set collection. In list L1 the most recently referenced item is 9, while the least recently referenced item is 11. These are respectively designated F=9 and La=11. As mentioned, this is a linked list format. The last item in the list must never be referenced. This LRU list is partitioned into k+3 groups. In FIG. 1, k=3. All items in group r have g=r.

The Table Construction

Table T1 contains k+3 rows and c columns with k=3. In Table 1, row r contains data about group r and the list. Column M contains the maximum number of items in the list which can be allocated to the group corresponding to row r. Column A contains the number of items in the list currently allocated to the group corresponding to row r. Column H sets out the number of times that the referenced item was currently allocated to the group corresponding to row r. Lastly, column L contains the number of the item which is the last item in the group corresponding to row r. Other columns in Table T1 can be used to store other information about each group of items in the list. The notation T1 (r,A) designates that the entry in Table T1 at row r column A, designating the actual capacity of a group can increase or decrease as items are referenced and the invention method executed. However, the relation $-1 < T1(r,A) < 1 + T1(r,M)$ holds for all values of r lying in the range $0 < r < k+4$.

The notation T1(1,M) designates the maximum number of items that can be stored in a cache of capacity c1 bytes. T1(1,M)+T1(2,M) designates the maximum number of items that could be stored in a cache of capacity c2 bytes, i.e., c2>c1. Furthermore, T1(1,M)+T1(2,M)+T1(3,M) represents the maximum number of bytes that could be stored in a cache of capacity c3 bytes, where c3 exceeds c2, etc. Lastly, T1(k+1,M)=T1(k+2,M) stands for the total number of items in the list that can be referenced. Significantly, the last in the list cannot be referenced; therefore, T1(k+3,M)=1.

Selecting Cache Sizes to Measure Hits/Misses

FIG. 1 represents a partition of an LRU stack into equivalence classes based upon the cache capacities of interest. But what are the capacities of interest? Most simply, these are obtained by consecutive addition of the maximum allowable group sizes represented by column M in Table T1. Namely, $c1=3$, $c2=3+4=7$, $c3=3+4+3=10$, $c4=c3+10=20$, $c5=c4+10=30$, $c6=c5+1=31$.

How does one determine whether a reference to an item for a given cache size ci is a hit or a miss? It would follow that reference to any item in group 1 is a hit given that $c1=3$. Also, reference to any item in group 2 would be a miss for a buffer of size 3 or less, while it would be considered a hit for a buffer of any size 7 or more. The rule is that the group number of an item i in an LRU stack is registered as a miss for all cache capacities less than the group number and a hit for all cache capacities equal to or greater than the group number.

Hits, Misses, and Overflow, Generally

Each request to data stored on DASD is a request to a physical location. In this invention, each physical location that is referenced must be assigned a number. Thus, a request to READ, WRITE, or ERASE data at location y is translated into a request for item number y with code=(r,w, or e). The detailed processing responsive to a READ or WRITE request is given in FIG. 3, while the processing responsive to an ERASE request is given in FIG. 4. The methods update T1(r, H). This entry in Table 1 counts the number of hits to group r. At the end of a sequence of requests, the counters T1(r, H) each contain the data needed to determine the hit ratio to data caches of capacity c1, c1, c3, etc., bytes. Additionally, if all items are initially in group $k+1$, then T1(k+1, H) gives the number of unique items referenced. Likewise, T1(k+2,H) gives the number of times a location has been erased and was subsequently reused for new data. The method illustrated in FIGS. 3 and 4 assumes that the list L1 is stored as a Table L1, shown in FIG. 2. Such a Table L1 will have as many rows as there are items being referenced, plus one, as well as entries for the counterpart n-tuples$<$f,b,g$>$. Also, L1(p, g) refers to the number stored in row p, column g, of Table L1.

When item y represents a READ or WRITE reference, then row y, column g, in Table L1 determines the group r to which item y is currently allocated. Row r, column H, in Table T1 is increased by 1 to indicate a 'hit' in the data cache. This means that if a data cache of capacity c or larger had been used, the referenced item would have been found. Significantly, item y should then become the first item in the list L1 and the first item in group 1 by having the values in Table L1, row y, changed appropriately because it is the most recently referenced item. Other items in the list may now change their group numbers. For example, if group 1 has the maximum number of items already allocated to it, the last member of that group must be pushed down the list into the next group by changing its group number from 1 to 2. The last item in group 1 is now different. If group 2 also has the maximum number of items already allocated to it, its last member must be pushed down the list into the next group by changing its group number from 2 to 3. The last item in group 2 is now different. This process is continued until an item is pushed into a group with less than the maximum number of items allocated to it. The number of items allocated to this group is increased by 1 and the method is ready to be applied to the next referenced item. The detailed method steps will be subsequently discussed with reference to FIG. 3.

When an item y is to be erased, this means that row y, column g, in Table L1, determines the group r to which y is currently allocated. After this, row r, column A, in Table T1 is decreased by 1 in order to show that one fewer item is allocated to this group. Item y is then removed from group r and is put as the next-to-last item in the list. That is, it is placed as the last item in group $k+2$. This is accomplished by changing the values in Table L1, row y, to the appropriate values. The method steps referencing erasure will be subsequently discussed with regard to FIG. 4.

Cache Managing In A Real Paging System—Flush Avoidance

In a real paging system cache data elements may be invalidated (erased) because the information they represent is no longer needed; i.e., when the process is either suspended or terminated.

This invention is operable in a hierarchical storage system having an LRU/MRU page replacement policy. However, sequential referencing using an LRU replacement policy fills the cache with references never again accessed. This flushing of the cache can destroy cache use for a competing process. Such a consequence also accrues for randomized referencing. That is, the probability of referencing the same item again is near zero. This means that there is a low hit ratio for virtually any given cache size. By the method of this invention, sequential and/or random access by a competing process will result in a small or zero cache size allocation for that process, thus avoiding flushing the entire system cache or obtaining a small number of hits to a large preallocated cache space for the given process.

Illustrative Examples

Figure 2:
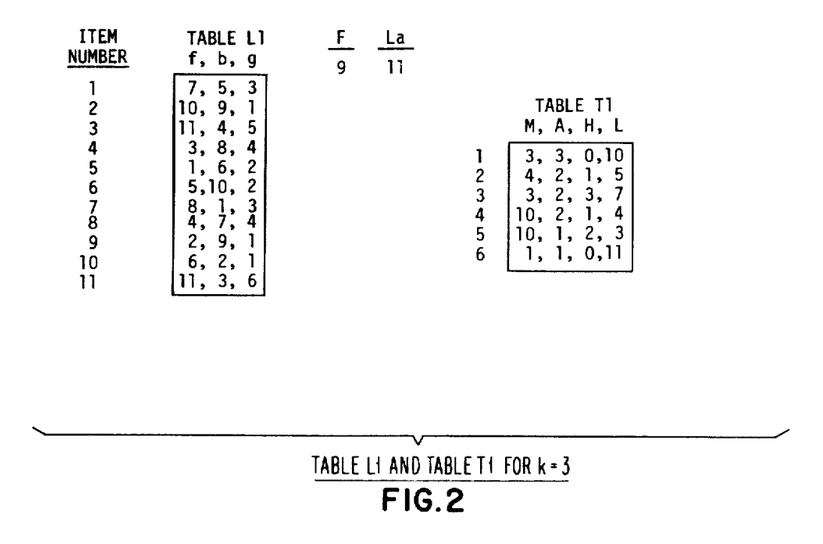
FIG. 2 represents a natural number item ordering of the LRU stack in FIG. 1.

Suppose reference was made to item 8 as seen in list L1 of FIG. 1, and Table L1 of FIG. 2. It is clear that item 8 is a member of group 4. Consequently, item 8 must be removed from group 4 and placed on top of the list; that is, the first element in group 1. This increases the size of group 1 to 4 members. Referencing Table T1 at T1(1, M) shows that it is allowed a maximum of only 3. It is thus necessary to manage the pushdown overflow of list L1. According to the rules governing the invention, element 10, shown as the last element of group 1, becomes the first element of group 2. This increases the size of group 2 to 3 members. Referencing Table T1 at T1(2, M) shows that it is allowed a maximum of 4 members, so no further pushdown is required.

A hole was created by removal of the most recently referenced item 8 for placement at the top of the list in group 1, there is no further overflow with respect to group 2; and changes must be made in all the affected tabular entries, such as the last item in each group reference with respect to Table T1, and the modification of the pointers in Table L1. It also follows that the count in T1(4, H) will be increased by 1, since the referenced item would be located in the cache containing group 4. Lastly, the actual occupancy of a cache will only equal its maximum if there are no invalidations, so that for most purposes $m \geq a$.

Special Circumstances

If the first item in the cache is referenced, it will remain the first item afterwards. If an item is not the first item of group 2, while group 1 has been totally invalidated, then the item is the first item in the list de facto.

A subtle point to consider is that there is really no correspondence between group and cache, but rather, correspondence between groups. That is, groups are synonymous with a particular cache size. For instance, a group 1 item would be resident in a cache of size c1. A group 2 item would be resident in a cache of size c2, where c2 is the sum of the table of maximum items allowed to groups 1 and 2.

The Method Step Responses To Each READ/WRITE Reference

Figure 3:
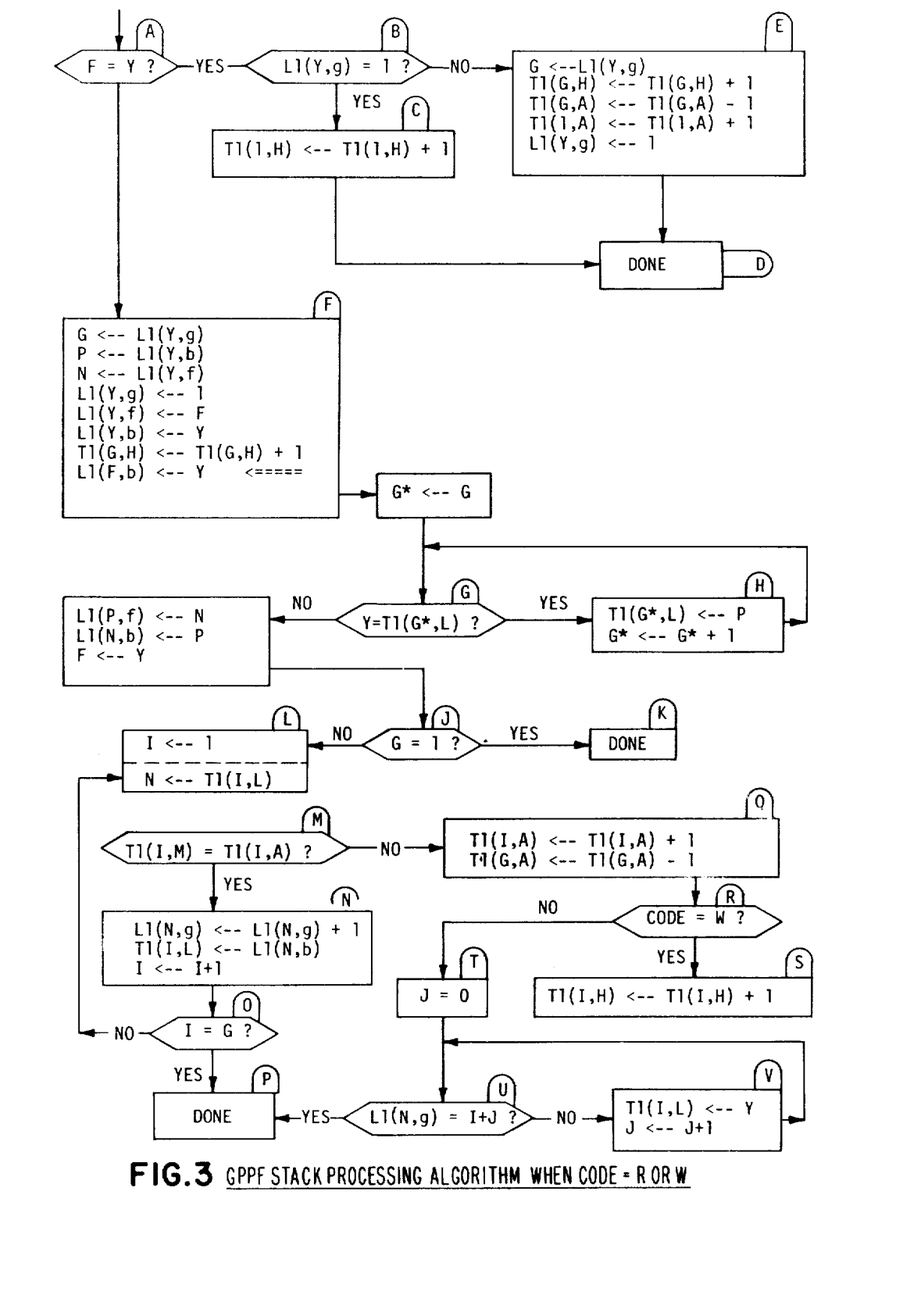
FIGS. 3 and 4 show respective processing of READ/WRITE or ERASE references to a cache according to the method of the invention.

Referring now to FIG. 3, there is shown the method steps responsive to each READ or WRITE reference. Starting at step A, it is first necessary to determine whether item y is the first item on list L1. If it is, then is the group number for item y equal to 1? If so, the referenced item is already at the top of the list and the only processing necessary is to increment T1(1, h) by +1. This is accomplished in step C, with step D representing process completion. On the other hand, if item y is the first item on the list (except for group 1), then it can only mean that it is the top of the list of the next inferior group under circumstances where all of the elements in group 1 have previously been erased. This means the process step E is invoked in which, after the group number of item y is ascertained, both the group number, the hits, and the list position are updated. After this, the processing is completed and moved to step D.

Now, if item y is not the first item in the list, the processing moves from step A to step F. Here, the first three entries are concerned with determining the group, previous item, and next item from list L1, and then altering these pointers so as to make the referenced item the first item in the list. Also, the referenced T1(g, H) is updated by +1. It is necessary to determine whether the referenced item y was the last member of some group g. That is, was it identified in Table T1(G, L)? If so, it is processed through the loop steps G and H. In step H, P is made the last item and item y is removed. If item y is not the last item, processing continues in step I, where item y is removed from the old position in list L1 and inserted to the top of the list.

The next step J tests whether removed item y was from group 1. If yes, then processing is completed at step K because removed item y is at the top of the list and no further processing is required. On the other hand, if item y was not in group 1, it is necessary to set the loop index I initially to 1 and push down the other items in the LRU list from group to group. This is done through the processing loop steps of L, M, N, O. In step L, the pointer to the next item n is set equal to T1(i, L). In step M, the question is rather group i is fully allocated. If not, its actual capacity is increased by 1, as represented in step Q, and the capacity of group G is decreased by 1. If group i is fully allocated, then processing continues in step N. Step N processing ascertains whether the bottom member of a superior group becomes the top member of the next inferior group. When this is accomplished, processing continues in step O. Step O determines whether the referenced item is removed from group g. If this is the case, then space is fully allocated and processing is completed by movement to step P. If not, then the overflow must be managed with reference to the next inferior group, as represented by cycling through steps L, M. N, O, one more time.

If group i is not fully allocated according to the processing of step M, (that is, that the maximum number of elements is not equal to the allocated number of elements in group i), then processing continues in step Q. Step Q adds +1 to allocated members of group i and decreases the allocation of group G. Significantly, step R tests whether the reference was for a READ or WRITE. If it was to a READ, then processing moves to step T and step U. At step U a test is made to determine if group i is empty. If group i is not empty, processing is completed by moving to step P. If group i is empty, y is made the last element of group i and the same test is made for the next group by cycling through steps U and V. If the reference was to a WRITE operation, then it is necessary to update the hit by +1 at table location T1(i, H). Stated another way, a WRITE reference to a cache having a 'hole' in the stack or having the data already entered is registered as a hit. A "miss" requires LRU processing in order to make a hole.

It is possible that a referenced item y can be the last item of more than one group in list L1. This arises as a consequence of how items are erased from lists. In this regard, the loop represented by steps G and H test whether y is the last member of the next group and continues around until y is not the last member of group g.

The most frequently traversed paths by READ/WRITE references include steps A, F, G, I, J, L, M, N, O, P, with a sidewise trip to Q, R, T, U. The remaining loops are for the anomalies.

The Method Step Responses to Each ERASE Reference

Figure 4:
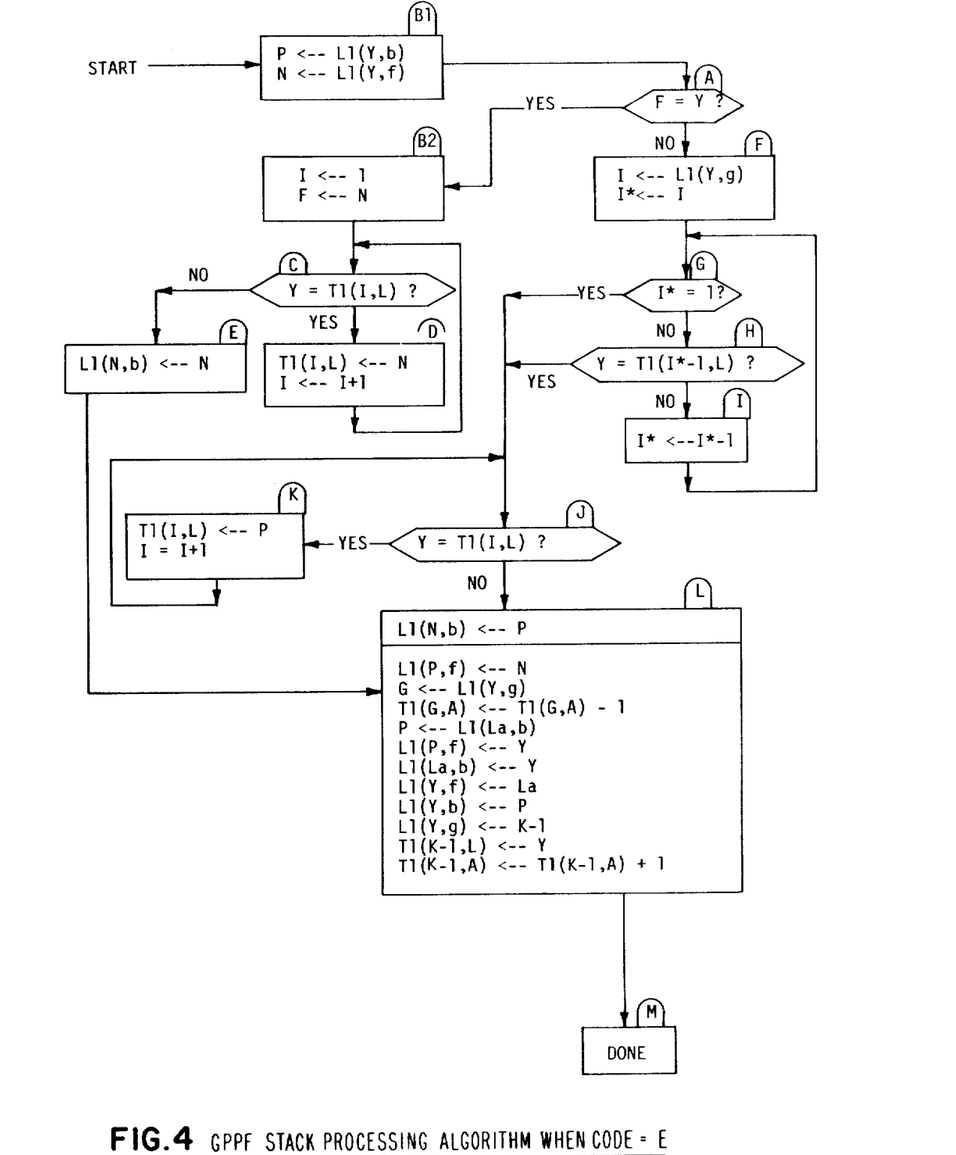

Referring now to FIG. 4, there is shown the processing where it is desired to delete an element either because it is no longer needed by an executing process, the process has itself been suspended or terminated, or a cache is full. The process starts in step B1 by determining the pointers to the previous item and the next item and then testing whether the erased item is the first item in the LRU list. If it is, then the processing continues in step B2 where the remaining steps are indexed by I being set initially to 1 and the first item in the list being replaced by the next item. Processing continues through steps C and D, which determines whether the referenced item is the last item of group i. Since this is usually not the case, processing would continue again in step E. Here, the back pointer of the next item is replaced with the value of the next item itself. This is because the first item in the list and its pointers must be self-referencing. After step E, processing continues in step L. Step L has two objectives. The first is to remove the referenced item from the LRU list and insert the item as the last item in the next-to-last group. The second is to increase the allocation of the k-1st group by +1.

Steps B, C, E, and L require some explanation. First, the cache is structured so that all groups but the last three are empty. Group k+1 contains every item that can be referenced. Group k+2 holds items that have been erased. Group k+3 contains one item which can never be referenced. Normally, y will not be the first item in the list, so that steps F, G, J, and L will be entered. Steps F, G, H, I, and J all deal with the anomaly that y is the last member of some group. Step L removes y from group G, decreases the number allocated to group G by 1, puts y as the last element of group k+2, and increases the number of items allocated to group k+2 by 1.

For each of the q data groups (paged data, nonpaged data, etc.), the steps outlined in FIGS. 3 and 4 are applied to every reference in a predetermined time interval. The values of T(i, H), for i=1 to p in a given data group, give the additional hits that could be obtained for increasing the cache size by an amount necessary to hold T(i, M) additional items in that data group. From these numbers, the relationship between cache hits and cache size can be determined for the preselected p cache sizes and q data groups. In no more than $(p+1)^q$ computations the allocation of the system cache to the q data groups can be determined such that the number of hits to the system cache is maximized for that time interval.

System/370 Assembly-Level Execution Sequence

The following table is an assembly-level language sequence, which, when invoked upon a processor of the type previously described, executes the method steps of the invention. These are set out in three tables. Table 1 sets out comment field and defines selected terms, including the set up and test as to whether a referencing CCW is a READ/WRITE or ERASE. Table 2 is an implementation of the ERASE processing set out in FIG. 4. Lastly, Table 3 is an implementation of the READ/WRITE referencing of FIG. 3. The entries in each of the tables are letter-coded to correspond to the counterpart step in the counterpart figure. It should be noted that the assembly code listings are in source code format. This means that the extreme left-hand column represents flags, the next column is the instruction op code, the third column is parameter or address information, while the extreme right column defines a comment field. Only the first three columns are compilable into object code. The comment fields are ignored by the computer.

TABLE 1

PROGRAM STARTS HERE

THIS IS THE ASSUMED CONTROL BLOCK STRUCTURE FOR M1

| Offset | Field | | | |
|---|---|---|---|---|
| 00 | BOX MEMORY ORIGIN | | | |
| 04 | Y (INPUT TO BOX) | | | |
| 08 | CODE DEE | COUNT 0 | | |
| 14 | EPTR | | | |
| 18 | VALUE Y(F) | VALUE Y(B) | Y(D) | |
| 25 | ADDR(START) | ADDR(Y) | 1 | |
| 32 | ADDR(END 1) | 2 | COUNT 1 | INCR 1 |
| 44 | ADDR(END 2) | 3 | COUNT 2 | INCR 2 |
| . | . | . | . | . |
| 200 | ADDR(END 15) | 16 | COUNT 15 | INCR 15 |
| 212 | ADDR(END 16) | 17 | COUNT 16 | INCR 16 |
| 224 | 0 | | 0 | −1 |

TABLE 2

| | EJECT | | | |
|---|---|---|---|---|
| M1 | DS | 0H | R1→CONTROL BLOCK, R2→CURRENT REF. | |
| | STCM | R2,7,AY(R1) | AY = ADDRESS OF Y | |
| | CLI | CODE(R1),C'E' | IF CODE = E THEN FREE SLOT | |
| | BNE | M1NW0 | ELSE GO TO M1NW0 | |
| M1F0 | DS | 0H | ALGORITHM WHEN CODE = E | |
| | MVC | VYF(7,R1),FP2(R2) | VYF = Y.F, VYB = Y.B, VYD = Y.D | |
| | CLC | AY(3,R1),ASTART(R1) | IF AY- = ASTART | A |
| | BNE | M1FC | THEN GO TO M1FC | A |
| | MVC | ASTART(3,R1),FP2(R2) | ELSE ASTART = VYF | B |
| | LA | R15,AEND1(0,R1) | X = 1 | B |
| M1FA | CLC | AY(3,R1),0(R15) | M1FA:IF AY- = AENDX | C |
| | BNE | M1FB | THEN GO TO M1FE | C |
| | MVC | 0(3,R15),FP2(R2) | ELSE AENDX = VYF | D |
| | LA | R15,12(0,R15) | X = X + 1 | D |
| | B | M1FA | GO TO M1FA | |
| M1FB | ICM | R2,7,VYF(R1) | MAKE NEW START POINT TO ITSELF | E |
| | MVC | BP2(3,R2),VYF(R1) | YF.B = VYF | E |
| | B | M1FG | GO REMOVE Y FROM TOP OF LIST | |
| M1FC | SR | R15,R15 | X = D | F |
| | IC | R15,VYD(0,R1) | | F |
| | MH | R15,M1TWELVE +2 | | |
| M1FD | C | R15,M1TWELVE | M1FD: IF X = 1 THEN GO TO M1FE | G |
| | LA | R2,8(R15,R1) | | G |
| | BE | M1FE | | |
| | CLC | AY(3,R1),0(R2) | IF AEND(X − 1)- = AY | H |
| | BNE | M1FE | THEN GO TO M1FE | H |
| | S | R15,M1TWELVE | ELSE X = X − 1 | I |
| | B | M1FD | GO TO M1FD | I |
| M1FE | LA | R2,12(0,R2) | M1FE: IF AENDX- = AY | J |
| | CLC | AY(3,R1),0(R2) | THEN GO TO M1FF | J |
| | BNE | M1FF | ELSE AENDX = VYB | |
| | MVC | 0(3,R2),VYB(R1) | X = X + 1 | K |
| | B | M1FE | GO TO M1FE | K |
| M1FF | ICM | R2,7,VYF(R1) | REMOVE Y FROM LIST | |
| | MVC | QBP2(2,R2),VYB(R1) | YF.B = VYB | |
| | ICM | R2,7,VYB(R1) | | |
| | MVC | FP2(B,R2),VYF(R1) | YB.F = VYF | |

TABLE 2-continued

| | | | | |
|---|---|---|---|---|
| M1 | EJECT<br>DS | 0H | | R1→CONTROL BLOCK, R2→CURRENT REF. |
| | SR | R15, R15 | | |
| | IC | R15,VYD(0,R1) | | |
| | MH | R15,M1TWELVE+2 | L | INCR D = INCR D+1 |
| | LA | R0,1 | | |
| | AL | R0,28(R1,R15) | | |
| | ST | R0,28(R1,R15) | | |
| | LH | R15,EPTR(0,R1) | | INSERT Y AT END OF LIST |
| | LA | R15,0(R15,R1) | | |
| | ICM | R2,7,0(R15) | | |
| | MVC | VYB(4,R1),BP2(R2) | | VYB = ENDN.B, VYD = N |
| | MVC | BP2,(3,R2),AY(R1) | | ENDN.B = AY |
| | ICM | R2,7,VYB(R1) | | |
| | MVC | VYF(3,R1),FP2(R2) | | VYF = AENDN |
| | MVC | FP2(3,R2),AY(R1) | | ENDNB.F = AY |
| | ICM | R2,7,AY(R1) | | |
| | MVC | FP2(7,R2),VYF(R1) | | Y.F. = VYF, Y.B = VYB, Y.D = VYD |
| | LA | R0,1 | | COUNT NUMBER OF FREE COMMANDS |
| | A | R0,16(0,R15) | | COUNT(N+1) = 1 + COUNT(N+1) |
| | ST | R0,16(0,R15) | | |
| | B | M1EXIT | M | GO TO RETURN TO CALLER |

TABLE 3

| | | | | |
|---|---|---|---|---|
| M1W0 | DS | 0H | | ALGORITHM WHEN CODE = R OR W |
| | CLC | AY(3,R1),ASTART(R1) | A | IF CURRENT INPUT- = LAST INPUT<br>THEN GO TO M1NWB |
| BNE | M1NWB | | | |
| | CLI | D(R2),X'01' | B | IF Y.D- = 1<br>THEN GO TO M1NWA |
| | BNE | M1NWA | | |
| | L | R0,COUNT0(R1) | | COUNT(0) = 1 + COUNT(0), |
| | AL | R0,M1ONE | | |
| | ST | R0,COUNT0(R1) | C | |
| | MVI | DEE(R1),X'00' | | DEE = 0, |
| | B | M1EXIT | D | GO TO M1 EXIT |
| M1NWA | SR | R15,R15 | | |
| | IC | R15(D(0,R2) | | |
| | S | R15,M1ONE | | |
| | NH | R15,M1TWELVE+2 | | |
| | LA | R15,AEND1(R15,R1) | | |
| | L | R0,4(0,R15), | | COUNT D = 1 + COUNT D |
| | A | R0,1ONE | | |
| | ST | R0,4(0,R15) | E | |
| | L | R0,8(0,R15) | | CREATE HOLE IN REGION D |
| | A | R0,M1ONE | | INCR DX = 1 + INCR D |
| | ST | R0,8(0,R15) | | |
| | LA | R15,AEND1(0,R1) | | |
| | L | R0,8(0,R15) | | |
| | S | R0,M1ONE | | |
| | ST | R0,8(0,R15) | | |
| | MVI | D(R2),X'01' | | Y,D = 1 |
| | B | M1EXIT | D | GO TO M1 EXIT |
| M1NWA | MVC | VYF(7,R1),FP2(R2) | | VFY = Y.F, VYB = Y.B, VYD = Y.D |
| | SR | R0,R0 | | |
| | IC | R0,VYD(0,R1) | | DEE = Y.D |
| | STC | R0,DEE(R1) | | |
| | MVC | FP2(7,R2),ASTART(R1) | | Y.F = ASTART, Y.B = AY, Y.D = 1 |
| | BCT | R0,M1NWC | E | |
| M1NWC | LR | R15,R0 | | |
| | MH | R15,M1TWELVE+2 | | |
| | LA | R15,AEND1(R15,R1) | | |
| | L | R2,4(0,R15) | | COUNT(D) = 1 + COUNT(D) |
| | AH | R2,M1ONE+2 | | |
| | ST | R2,4(0,R15) | | |
| M1NWD | CLC | AY(3,R1),0(R15) | G | IF AY = AEND D<br>THEN GO TO M1NWE |
| | BNE | M1NWE | | |
| | MVC | 0(3,R15),VYB(R1) | H | ELSE AEND D = VYB |
| | LA | R15,12(0,R15) | | D = D + 1 |

TABLE 3-continued

| | | | ALGORITHM WHEN CODE = R OR W |
|---|---|---|---|
| M1W0 | DS | 0H | |
| | B | M1NWD | GO TO M1NWD |
| M1NWE | SR | R2,R2 | REMOVE Y FR0M LIST |
| | ICMMVC | R2,7,VYB(R1) | |
| | ICM | FP2(3,R2),VYF(R1) | YB.F = VYF |
| | MVC | R2,7,VYF(R1) | |
| | | BP2(3,R2),VYB(R1) | I    YF.B = VYB |
| | ICM | R2,7,ASTART(R1) | |
| | MVC | BP2(3,R2),AY(R1) | START.B = AY |
| | MVC | ASTART(3,R1),AY(R1) | ASTART = AY |
| | CLI | VYD(R1), X'01' | J    IF VYD = 1 THEN GO TO M1EXIT |
| | BE | M1EXIT | K |
| | LA | R15, AEND1(0,R1) | L    X = 1 |
| M1NWF | CLC | 8(4,R15), M1ZER0) | IF INCR X- = 0 THEN GOT TO M1NWG |
| | | | M    BECAUSE THERE IS A HOLE TO FILL |
| | ICM | R2,7,0,(R15) | PUSH LRU ITEM TO NEXT REGION |
| | MVC | D(1,R2),3(R15) | ENDX.D = 1 +ENDX.D |
| | MVC | 0(3.R15),BP2(R2) | N    AENDX = ENDX.B |
| | LA | R15,12(0,R15) | X = X + 1 |
| | BCT | R0,M1NWF | O    IF X > D THEN GO TO M1NWF |
| | B | M1EXIT | P    IF X = D THEN GO TO M1EXIT |
| | L | R2,8(0,R15) | REMOVE HOLE FR0M REGION X |
| | S | R2,M1ONE | (INCR X) = (INCR X) −1 |
| | ST | R2,8(0,R15) | |
| | SR | R2,R2 | PUT HOLE IN REGION D |
| | | | (INCR D) = (INCR D) −1 |
| | IC | R2,VYD(0,R1) | Q |
| | MH | R2,M1TWELVE+2 | |
| | L | R0,28(R2,R1) | |
| | A | R0,M1ONE | |
| | ST | R0,28(R2,R1) | |
| | CLI | CODE(R1)C'W' | IF CODE - = 'W' |
| | | | R    THEN GO TO M1NWH |
| | BNE | M1NWH | |
| | LA | R2,1 | IF CODE = 'W' COUNTX = COUNTX + 1 |
| | AL | R2,4(0,R15) | S    BECAUSE IT IS A WRITE HIT TO |
| | ST | R2,4(0,R15) | THE HOLE |
| M1NWH | ICM | R2,7,0(R15) | T    I = 1 |
| M1NWI | CLC | D(1,R2),3(R15) | U    IF ENDX.D < END1.D+1 |
| | BL | M1EXIT | P    THEN GO TO M1EXIT |
| | MVC | 0(3,R15),AY(R1) | AENDX = AY |
| | LA | R15,12(0,R15) | V    X = X + 1 |
| | B | M1NWI | TO TO M1NWI |
| M1DATA | DS | 0F | |
| N1ZERO | DC | F'0' | ' ZERO |
| M1ONE | DC | F'1' | ' ONE |
| M1SEVEN | DC | F'7' | ' SEVEN |
| M1TWELVE | DC | F'12' | ' TWELVE |
| PROGRAM ENDS HERE | | | |
| M1EXIT | L | R13,4(0,R13) | |
| | LM | R14,R12,12(R13) | |
| | BR | R14 | |
| DATA STARTS HERE | | | |
| | DS | 0F | |
| | LTORG | | |
| | DS | 0F | |
| SA00001 | DS | 18F | |
| | DC | V(TMA1WSET) | |
| | END | TMA1M1 | |

While the invention has been particularly shown and described with reference to dynamic cache management between DASD backing store and CPU memory, it may also be used to control cache operations for all nonpaging I/O, as well as DASD cache paging. The described and other embodiments will be understood by those skilled in the art and that the foregoing and other changes in form and detail may be made therein without departing from the spirit and scope of the invention.

We claim:

1. A CPU-implementable method for dynamically adjusting the portions of LRU-referenceable memory space shared among concurrently executing sequential processes in which a supervisory process is invoked to manage the memory referencing, wherein the steps include:

(a) determining an optimal space allocation among the processes by (1) accumulating a trace of consecutive references to items stored in the LRU memory space;

(2) partitioning the space over a range of predetermined sizes;

(3) ascertaining the hit/miss ratios from the accumulated trace as a function of LRU memory space partition sizes; and (4) responsive to each trace reference, LRU ordering the items in the partitioned space and adjusting for overflow among the partitions; and (b) reallocating the partitions among the concurrent processes according to and in overlapped relation with the determination step by the supervisory process.

2. A machine-implemented method for dynamically selecting pageable groups of data and associated cache sizes with respect to one or more caches of a CPU-accessible demand paging hierarchical storage system, said system having an LRU/MRU page replacement policy, including the erasure of cache stored items, the cache being shared among concurrently executing sequential processes in which a supervisory process is invoked to manage the memory references, the method steps include:

(a) determining the optimal space allocation among the processes by (1) accumulating a trace of consecutive references to items stored in the cache, (2) processing the traces to obtain hit/miss ratios as a function of q pageable groups and p cache sizes, said processing step including the step of partitioning an LRU page stack into $p+1$ equivalence classes, all pages in any given partition having the same stack distance, (3) arranging the groups of pageable data responsive to each reference by ordering the items in the cache and adjusting for overflow so as to maintain the highest hit ratio as a function of cache size; and (b) reallocating the cache among the concurrent processes according to and in overlapped relation with the determination step by the supervisory process.

3. A machine-implemented method according to claim 2, wherein the determination step requires no more than $(2p+1)$ items requiring movement, alteration, or scanning per referenced item and no more than $(p+1)^q$ computations within each predetermined time period.

4. A machine-implemented method according to claim 3, wherein:

(a) the step of partitioning an LRU stack into equivalence classes is a function of the consecutive addition of the maximum predetermined group sizes; and (b) a reference to an item for a given cache size is registered as a miss if the group number of an item i in an LRU stack is less than the group (position) number and is registered as a hit for all cache capacities equal to or greater than the group number.

* * * * *